United States Patent
Gill et al.

(10) Patent No.: US 6,937,412 B1
(45) Date of Patent: Aug. 30, 2005

(54) METHOD AND APPARATUS FOR CREATING A FORMAT IDENTIFICATION BLOCK ON A MAGNETIC TAPE

(75) Inventors: Richard Allen Gill, Arvada, CO (US); Roger D. Hayes, Denver, CO (US); Keith Gary Boyer, Broomfield, CO (US)

(73) Assignee: Storage Technology Corporation, Louisville, CO (US)

( * ) Notice: Subject to any disclaimer, the term of this patent is extended or adjusted under 35 U.S.C. 154(b) by 339 days.

(21) Appl. No.: 10/206,317

(22) Filed: Jul. 26, 2002

(51) Int. Cl.⁷ ................................................ G11B 5/09

(52) U.S. Cl. ........................................................ 360/48

(58) Field of Search ............................. 360/48, 77.01, 360/77.12, 77.1; 714/5

(56) References Cited

U.S. PATENT DOCUMENTS

| | | | | |
|---|---|---|---|---|
| 4,646,175 A | * | 2/1987 | Sokolik et al. | 360/78.02 |
| 6,525,898 B1 | * | 2/2003 | Chliwnyj et al. | 360/77.12 |
| 6,701,450 B1 | * | 3/2004 | Gold et al. | 714/5 |

* cited by examiner

*Primary Examiner*—David Hudspeth
*Assistant Examiner*—Glenda P. Rodriguez
(74) *Attorney, Agent, or Firm*—Yee & Associates, P.C.

(57) ABSTRACT

A method, apparatus, and computer instructions for writing data to a magnetic media. A first frequency is written on a first track on the magnetic media on a first track width. A second frequency is written on the first track in which a combination of the first frequency and the second frequency encodes a bit of data on the first track. An erase pattern is created on a second track on the magnetic media, the second track being adjacent to the first track in which the bit of data on the first track is readable by a tape drive system having a second track width wider than the track width of the first track.

54 Claims, 6 Drawing Sheets

FIG. 4A  DATA BIT = 0

FIG. 4B  DATA BIT = 1

METHOD AND APPARATUS FOR CREATING A FORMAT IDENTIFICATION BLOCK ON A MAGNETIC TAPE

BACKGROUND OF THE INVENTION

1. Field of the Invention

The present invention relates generally to an improved data processing system, and in particular, to a method and apparatus for providing backward compatibility on magnetic tape. Still more particularly, the present invention provides a method and apparatus for creating a format identification burst that is readable by tape systems employing different formats.

2. Background of the Invention

Magnetic tape is a sequential storage medium used for data collection, backup, and historical purposes. Magnetic tape is made of flexible plastic with one side coated with a ferromagnetic material. Magnetic tapes come in reels and cartridges of many sizes and shapes. In older systems, open reels are used while most presently available systems employ cartridges to hold the magnetic tape.

Data is written serially onto magnetic tape and must be accessed in a serial fashion. Locating a specific record on tape requires reading every record in front of it or searching for markers that identify predefined partitions. Although most tapes are used for archiving rather than routine updating, some drives allow rewriting in place if the byte count does not change. Otherwise, updating requires copying files from the original tape to a blank tape (scratch tape) and adding the new data in between.

Tracks either run parallel to the edge of the tape (linear recording) or diagonally (helical scan). For information storage and retrieval, magnetic tape has proven especially reliable, cost efficient and easy to use. In an effort to make magnetic tape even more useful and cost effective, attempts have been made to store more information per given width and length of tape. This increase in storage has generally been accomplished by including more data tracks on a given width of tape. While allowing more data to be stored, this increase in the number of data tracks results in those tracks being more densely packed onto the tape.

With increasing the number of tracks, the width of each track on a magnetic tape has decreased. With higher density in the number of tracks, different tape formats for recording data are present for the different track widths. Newer tape systems are often designed to be backward compatible, allowing them to read tapes written by older systems, having wider track widths. Older tape systems, however, are unable to read data written by newer systems. This situation sometimes may result in a magnetic tape having data written on a newer tape system being inadvertently overwritten with data by an older tape system because the older tape system is unable to detect the presence of data on the magnetic tape.

Therefore, it would be advantageous to have an improved method, apparatus, and computer instructions for detecting a tape format written to tape by both newer and older tape systems.

SUMMARY OF THE INVENTION

The present invention provides a method, apparatus, and computer instructions for writing data to a magnetic media. A first frequency is written on a first track on the magnetic media on a first track width. A second frequency is written on the first track in which a combination of the first frequency and the second frequency encodes a bit of data on the first track. An erase pattern is created on a second track on the magnetic media, the second track being adjacent to the first track in which the bit of data on the first track is readable by a tape drive system having a second track width wider than the track width of the first track.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
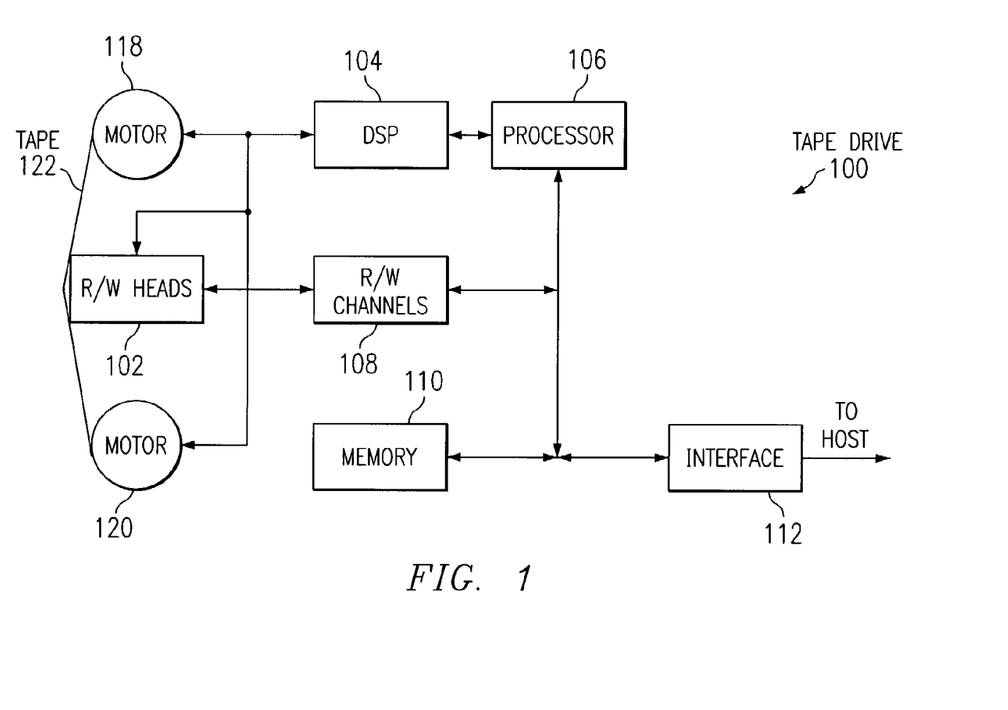
FIG. 1 is a block diagram of a tape drive in accordance with the present invention.

With reference now to FIG. 1, a block diagram of a tape drive in accordance with the present invention is depicted. Tape drive 100 is an example of a tape drive system in which the mechanism of the present invention for creating and reading data may be implemented. The mechanism allows for information, such as a format identification block to be written on a magnetic tape in a manner that allows this data to be read by tape drives implementing different recording formats and track widths.

As illustrated, tape drive 100 includes processor 106, digital signal processor (DSP) 104, read/write (R/W) heads 102, read/write (R/W) channels 108, memory 110, interface 112, and motors 118–120. Processor 106 executes instructions stored within memory 110 that control the functions of the other components within tape drive 100 such that read and write functions may be executed. Instructions for writing and reading data, such as a format identification block, may be stored in memory 110. Memory 110 is a nonvolatile memory, such as a nonvolatile random access memory.

Processor 106 may be implemented in various ways depending on the particular embodiment. For example, processor 106 may be a microprocessor or may even take the form of an advanced RISC microprocessor (ARM). Specifically, processor 106 executes instructions used to write and read data in a manner that other tape drives may read this data even if those tape drives are designed to read data on tracks having a different track width than tape drive 100.

Interface 112 provides an interface to allow tape drive 100 to communicate with a host computer or with a host network. Motors 118–120, controlled by digital signal processor (DSP) 104, move tape 122 such that read/write heads 102 can read information from or write information to tape 122. Tape 122 is a magnetic tape in these examples.

During write operations, read-write channels 108 provides for the reliable conversion of digital data into analog signals that drive the elements of read/write head 102. Read/write head 102 creates magnetic patterns on tape 122 as it is moved past. The conversion process includes the generation and appending of error correcting data to the digital data stream that is used during readback to help ensure that data errors are detected and corrected.

During readback, R/W channels 108 processes the analog head signals created by read/write head 102 as tape 122 is moved past. The channels extract the data, detect and correct errors, and provide a digital data stream to processor 106, memory 110, and interface 112.

Figure 2:
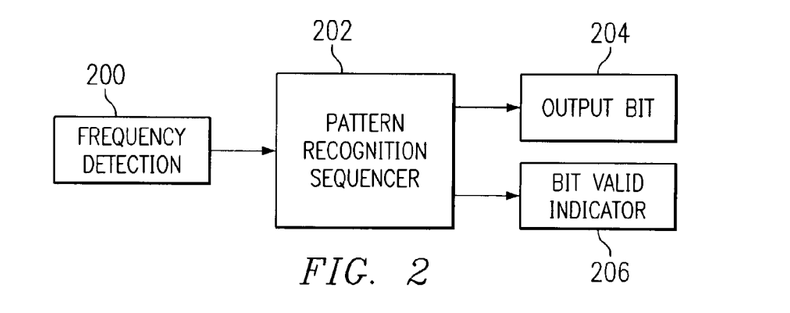
FIG. 2 is a diagram illustrating components used to read and write data in accordance with a preferred embodiment of the present invention.

With reference now to FIG. 2, a diagram illustrating components used to read and write data is depicted in accordance with a preferred embodiment of the present invention. In this example, frequency detection 200 and pattern recognition sequencer 202 are employed to read and write data to a magnetic tape, such as tape 122 in FIG. 1. Frequency detection 200 is part of a read channel within read/write channels 108 in FIG. 1. Pattern recognition sequencer 202 is a software component executed by a processor, such as processor 106 in FIG. 1.

Pattern recognition sequencer 202 may be implemented in a tape drive to read and/or write a format identification block of the present invention. The mechanism of the present invention implements a burst encoding scheme to write data. In these examples, two different frequency patterns are employed to create a small burst to encode a single data bit within the burst, which is also referred to as a "data burst". The frequency used may be of any frequency. The difference between the frequencies used should be sufficient such that detection circuitry can differentiate between the different frequencies employed in creating the data burst. A set of data bursts may be written in a serial method to create any number of bits to store information, such as information about the current format of the data written to the tape and any other information, such as the tape identifier and load statistics.

In the case where the format is a small track width, the sequence of data bursts may be written on one track while an erase pattern is written in a region relative to the lower track density width, such as on another track. An erase pattern is a written frequency, which is high enough to create a null response in a read back signal. Although these examples employ an erase pattern, any pattern or frequency may be used that results in a null response in a signal read by the tape drive system. A null response is a response that is sufficiently low in amplitude such that the response does not affect the adjacent pattern that is to be detected. In these examples, the adjacent pattern is the area or track on which the data burst is written. Depending on the particular implementation, the erase pattern may be written first on one track. Then the sequence of data bursts may be written on a track adjacent to the track containing the erase pattern. This writing of data allows a drive with a wider track width to read the data even though the data may be located on only half of the track width.

Pattern recognition sequencer 202 may be employed to read and write this type of data. When the data on the data bursts is detected by frequency detection 200, the particular data bits are recognized based upon the alternating patterns of the first and second frequencies. Depending on the duration or length of the first frequency compared to the duration or length of the second frequency within a data burst, a bit is identified in output as output bit 204 along with a bit valid indicator 206. If pattern recognition sequencer 202 is unable to identify the presence of a bit, bit valid indicator 206 will not be generated.

Figure 3:
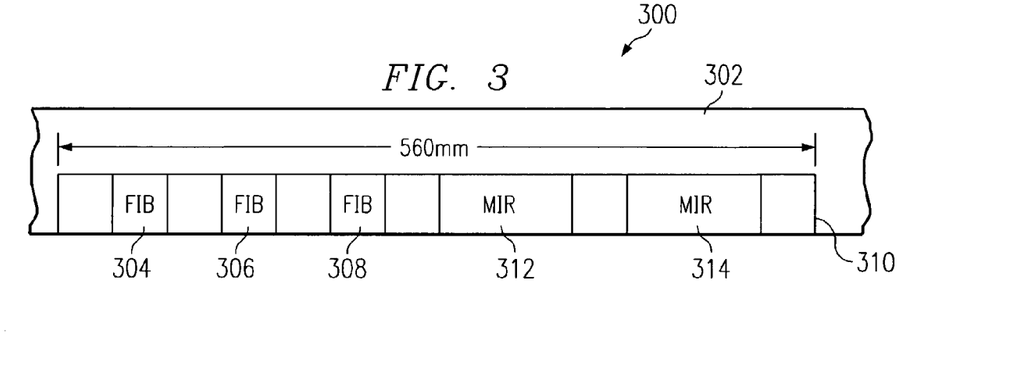
FIG. 3 is a diagram illustrating a portion of a magnetic tape containing data written using burst encoding in accordance with a preferred embodiment of the present invention.

Turning now to FIG. 3, a diagram illustrating a portion of a magnetic tape containing data written using burst encoding is depicted in accordance with a preferred embodiment of the present invention. In this example, tape 300 includes erase pattern 302 written in an area on which data is to be encoded using burst encoding through the use of different frequency patterns. In these examples, the frequency patterns are located in format identification burst (FIB) 304, format identification burst 306, and format identification burst 308. These burst sections are located at the beginning of the tape. The data in each of these sections is identical and written multiple times to provide for increased redundancy. The data within each section is created through a data burst encoding scheme using two different frequency patterns to encode data bits. This information is overwritten on track 310.

After the frequency identification bursts, other information is written into media information region (MIR) 312 and media information region 314. In these examples, the information in the media information regions is written in the normal format for the tape system, rather than using burst encoding of the present invention. Media information region 312 and media information region 314 are identical copies of each other. Each of these regions may include information, such as, for example, a format identifier block, an information block, a performance logging block, and a data valid or invalid block. The format identifier block defines the format variation that the media is currently written with and the type of cartridge used. The performance block contains information detailing where host logical records are located along with the locations of partitions and defects. The performance logging block contains information on tape usage and errors. The data valid and invalid blocks are used to identify whether the information in the media information region is current.

Only a limited amount of data is illustrated as being written using burst encoding because the density of this type of data is low compared to that of the normal recording format. Sufficient data is written into the format identification regions to allow a tape drive to identify that data is written on the tape. Other data may be included, such as, for example, a tape identifier or a volume number. Typically a format identification burst may only be 30 bytes in size, while a media information region may be 25 kilobytes to 30 kilobytes in size. Of course, any amount of data may be written using the burst encoding scheme depending on the particular implementation.

Figure 4A:
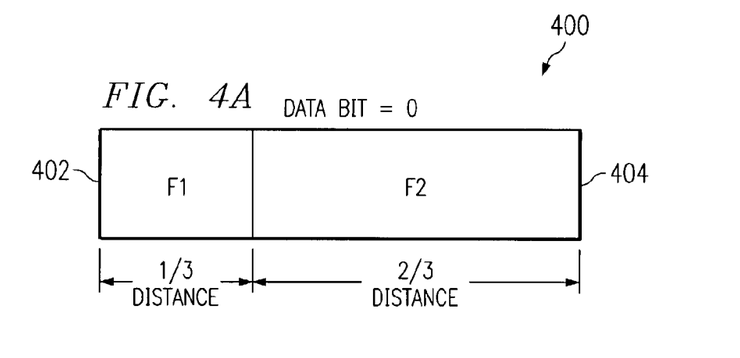
FIGS. 4A and 4B are diagrams illustrating a burst of data using burst encoding in accordance with a preferred embodiment of the present invention.
Figure 4B:
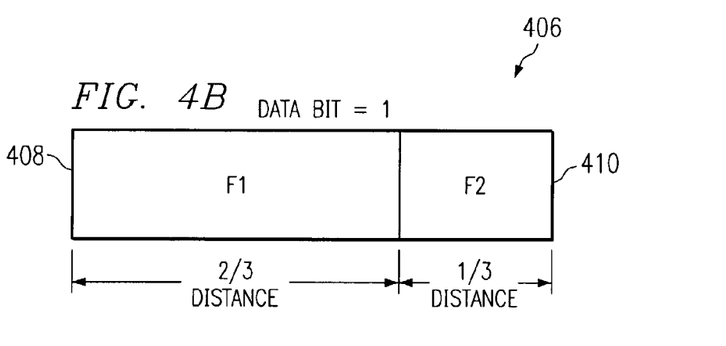

Referring next to FIGS. 4A and 4B, diagrams illustrating a burst of data using burst encoding are depicted in accordance with a preferred embodiment of the present invention. In FIG. 4A, data burst 400 first contains data written at frequency F1 in section 402 followed by data written in frequency F2 in section 404. In this example, section 402 is one-third of the distance of section 404. Data burst 400 represents a data bit having a logical 0.

Next, in FIG. 4B, data burst 406 has a data bit set equal to a logical 1. In this example, frequency F1 is located in section 408, while frequency F2 follows in section 410. In this example, section 408 has a distance that is two-thirds of the distance of section 410. Although the proportions of the sections are shown to be one-third and two-thirds, any length of the duration may be used depending on the particular implementation. The one-third and two-thirds sections illustrated are not meant to be limitations on the particular proportion of length or duration of the frequencies. For example, the variation in the length of each section may differ between different data bursts. A detection of the first frequency is used to identify the beginning of a data burst in these examples. The particular frequency used at a selected point, such as the midpoint of the data burst, may be used to identify whether the data encoded in the data burst is a logical 1 or a logical 0.

The length or duration of a data burst may vary depending on the particular implementation. The length should be one that is sufficient to allow discrimination or identification of the data within the data burst. The particular length may vary for each type of tape drive.

Figure 5:
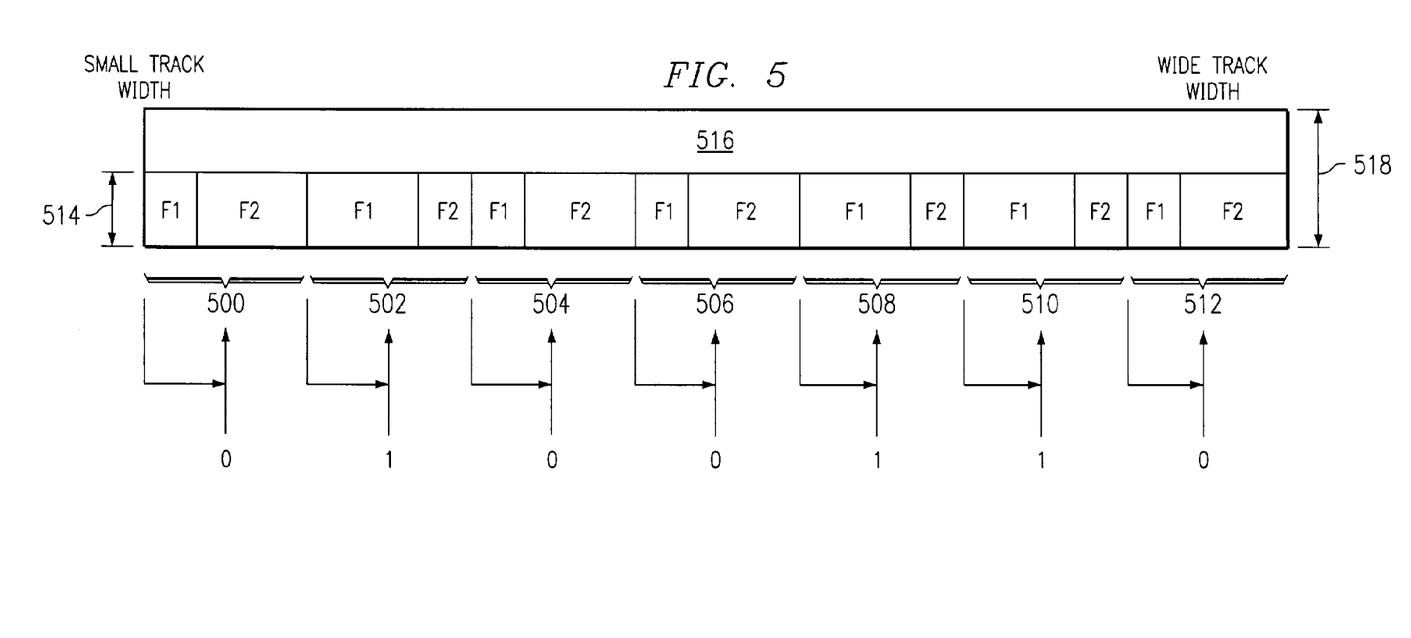
FIG. 5 is a diagram illustrating a set of bits encoded using burst encoding with different frequencies in accordance with a preferred embodiment of the present invention.

Turning now to FIG. 5, a diagram illustrating a set of bits encoded using burst encoding with different frequencies is depicted in accordance with a preferred embodiment of the present invention. In this example, data bursts 500, 502, 504, 506, 508, 510, and 512, are illustrated. The data in these data bursts may be located in a section of data, such as format identification burst 304 in FIG. 3. In this example, the identification of whether a bit is set equal to a 1 or a 0 is identified by the frequency at a sampling point. In this example, the sampling point is at the middle of a data burst. In this example, the data burst encodes the following bits of data: 0100110.

As can be seen in FIG. 5, the data bursts are written on track width, using small track width 514, while erase pattern 516 is written on wide track width 518. In this example, erase pattern 516 is written on wide track width 518, which is the track width used by an older tape drive. The data bursts are written using small track width 514, which is one-half of wide track width 518 in this example. In this manner, an older tape drive system may read the data bursts even though this data is encoded on a narrower track width. The erase pattern avoids having data being located on an adjacent track and causing errors in the reading of the data by an older tape drive, which uses a wider track width.

This scheme for encoding and reading data allows a single tape cartridge for recording multiple tape formats with different track widths to be read and detected by different tape drives. By writing or encoding data bursts using different frequencies, an older tape drive system using a wider track width may be able to detect data being present on a tape even though the actual data may not be readable. Without this type of encoding, accidental erasure and overwriting of tapes may occur if data formatted on a narrower track width is placed into a tape drive using a wider track width. Without this type of encoding, the tape drive using the wider track width is unable to detect data written for the narrower track width.

The mechanism of the present invention allows for the detection of data written on a magnetic tape in two different types of tape drives. The use of the terms "tape" and "magnetic tape" are used interchangeably herein. In this example, drive A is a tape drive using a wider track width than drive B. Data written by drive A is in format A, while data written by drive B is written in format B. Data written in format B is written on tracks having a width narrower than that written on format A.

When drive A reads a tape and a format information burst or a media information region is not detected, the tape is identified as blank. Likewise, when drive B reads a tape and a format identification burst and a media information region are not detected, the tape is also identified as blank.

When a blank tape is written to by drive A, a media information region is recorded along with data after the media information region. The tape recorded in format A is readable by drive B. The reverse, however is not true. Data written by drive B is in format B. This data is not readable by drive A, which has a wider track width.

The mechanism of the present invention includes a format identification burst before the media information region, which is readable by drive A and drive B. This format identification burst may be encoded in a fashion as illustrated in FIGS. 3–5. Consequently, drive A is unable to read the data in format B, but drive A is able to detect and read the data in the format identification burst. As a result, drive A is able to identify that the tape contains data, such as a tape identifier and a volume number. Other information, such as the format of the tape, also may be encoded within the format identification burst. Therefore, drive A will not identify the tape as a blank tape. In this manner, data on this tape will not be inadvertently overwritten. In this manner, the mechanism of the present invention allows for a tape to be used in tape drives supporting different formats while avoiding inadvertent erasing or overwriting of tapes containing data.

Figure 6:
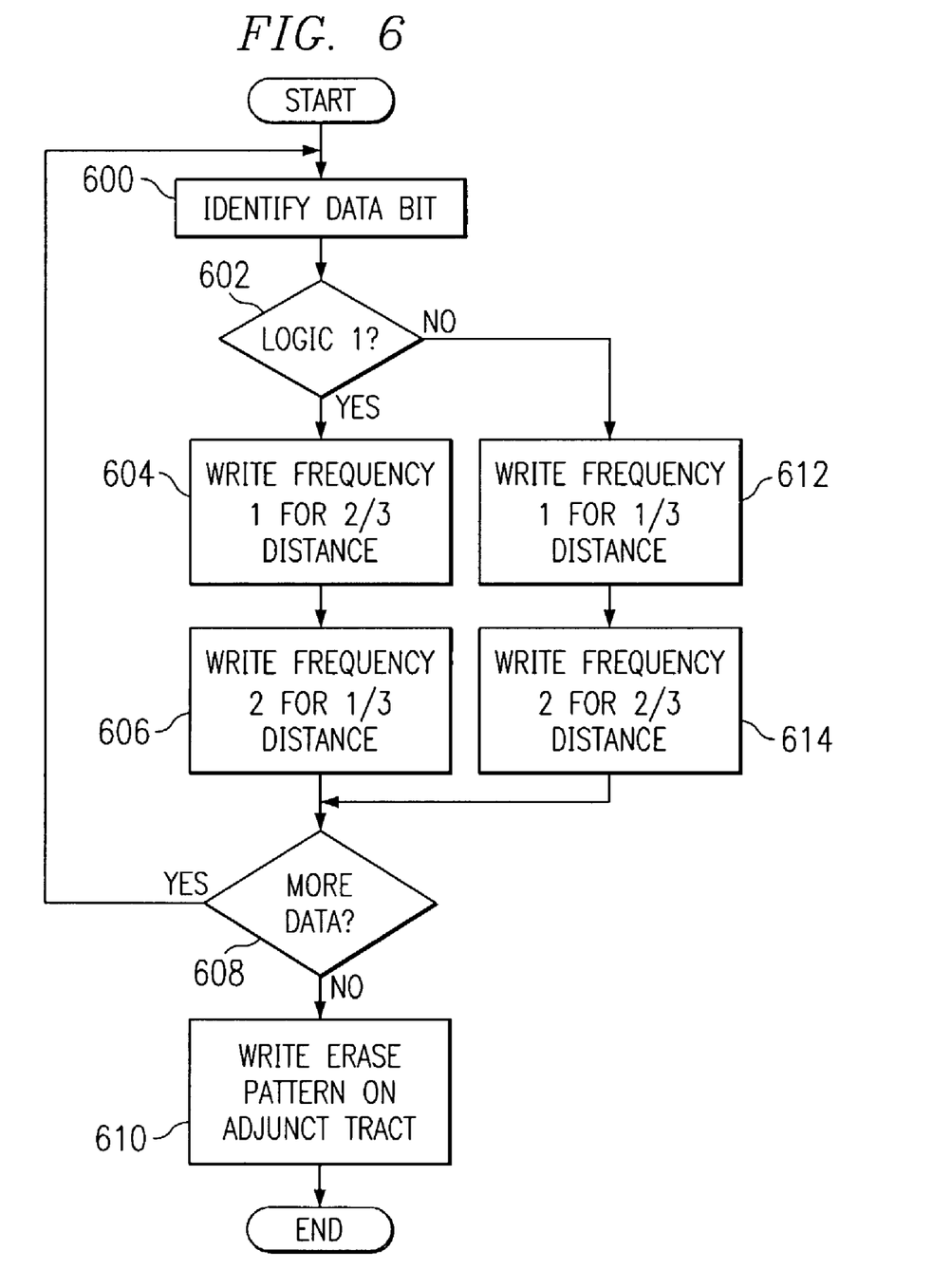
FIG. 6 is a flowchart of a process used for encoding data as data bursts in accordance with a preferred embodiment of the present invention.

Turning now to FIG. 6, a flowchart of a process used for encoding data as data bursts is depicted in accordance with a preferred embodiment of the present invention. The process illustrated in FIG. 6 may be implemented in a tape drive system, such as tape drive 100 in FIG. 1. Specifically, the steps illustrated in FIG. 6 may take the form of computer instructions executed by processor 106 in FIG. 1.

The process begins by identifying a data bit (step 600). The data bit may be a bit of data that forms a format identification burst, such as format identification burst 304 in FIG. 3. A determination is made as to whether the data bit is logic 1 (step 602). If the data bit is logic 1, frequency 1 is written on the tape for two-thirds of the distance (step 604). This frequency is written for two-thirds of the total distance or duration of the data burst. Next, frequency 2 is written for one-third of the distance of the data burst after frequency 1 (step 606) and a determination is made as to whether more data is present (step 608). If more data is absent, an erase pattern is written on an adjunct tract (step 610) with the process terminating thereafter.

Returning again to step 608, if more data is present, the process returns to step 600 as described above. With reference again to step 602, if the data bit is not logic 1, frequency 1 is written for one-third of the distance of the data burst (step 612). Frequency 2 is written for two-third of the distance of the data burst (step 614) and the process returns to step 608 as described above.

Step 610 may be performed prior to writing data bits using data burst encoding. In such a case, the erase pattern may be written in a wider track width associated with an older or legacy tape drive. The data bursts are written using a track width of the current tape drive in which the data bursts encompass a portion of the track width in which the erase pattern is written in a manner similar to that illustrated in FIG. 3.

Figure 7:
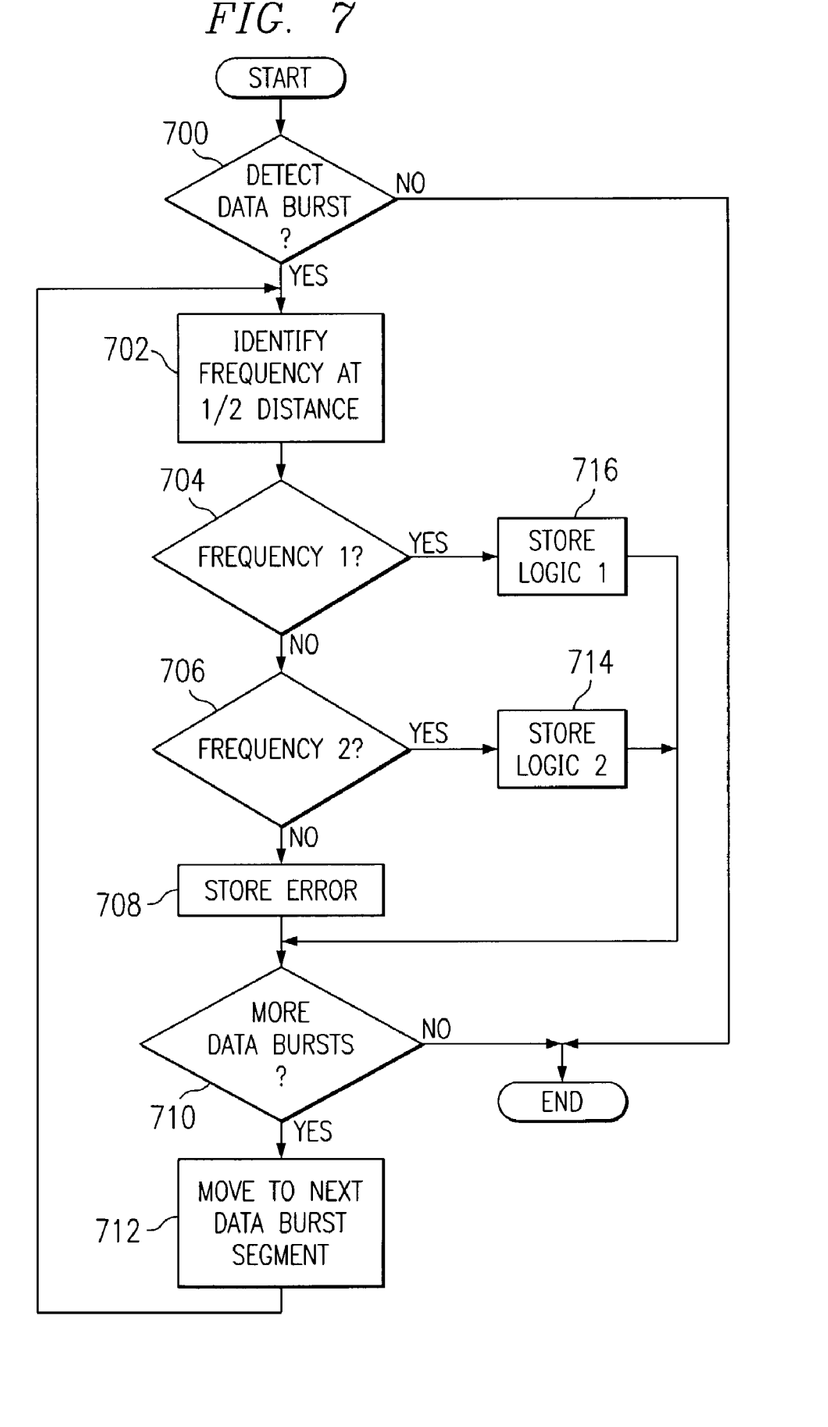
FIG. 7 is a flowchart of a process used for reading data bursts in accordance with a preferred embodiment of the present invention.

With reference now to FIG. 7, a flowchart of a process used for reading data bursts is depicted in accordance with a preferred embodiment of the present invention. The process illustrated in FIG. 7 may be implemented in a tape drive system, such as tape drive 100 in FIG. 1. Specifically, the steps illustrated in FIG. 7 may take the form of computer instructions executed by processor 106 in FIG. 1. These instructions are executed for a software component, such as pattern recognition sequencer 202 in FIG. 2 to read data bursts encoded on a tape.

The process begins by detecting whether a data burst is present (step 700). If a data burst is detected, the frequency is identified at one-half of the distance for the data burst (step 702). A determination is made as to whether the frequency is frequency 1 (step 704). If the frequency is not frequency 1, a determination is made as to whether the frequency is frequency 2 (step 706). If the frequency is not frequency 2, the error is stored (step 708). Thereafter, a determination is made as to whether more data bursts are present (step 710). If another data burst is present, the tape is advanced to read the next data burst segment (step 712) and the process returns to step 702 as described above.

With reference again to step 706, if the frequency is 2, logic 2 is stored (step 714) and the process proceeds to step 710 as described above to determine whether more data bursts are present on the tape. If, in step 710, additional data bursts are absent, the process terminates.

Referring again to step 704, if the frequency is 1, logic 1 is stored (step 716) and the process proceeds to step 710 as described above. With reference again to step 700, if a data burst is not detected, the process terminates.

Figure 8:
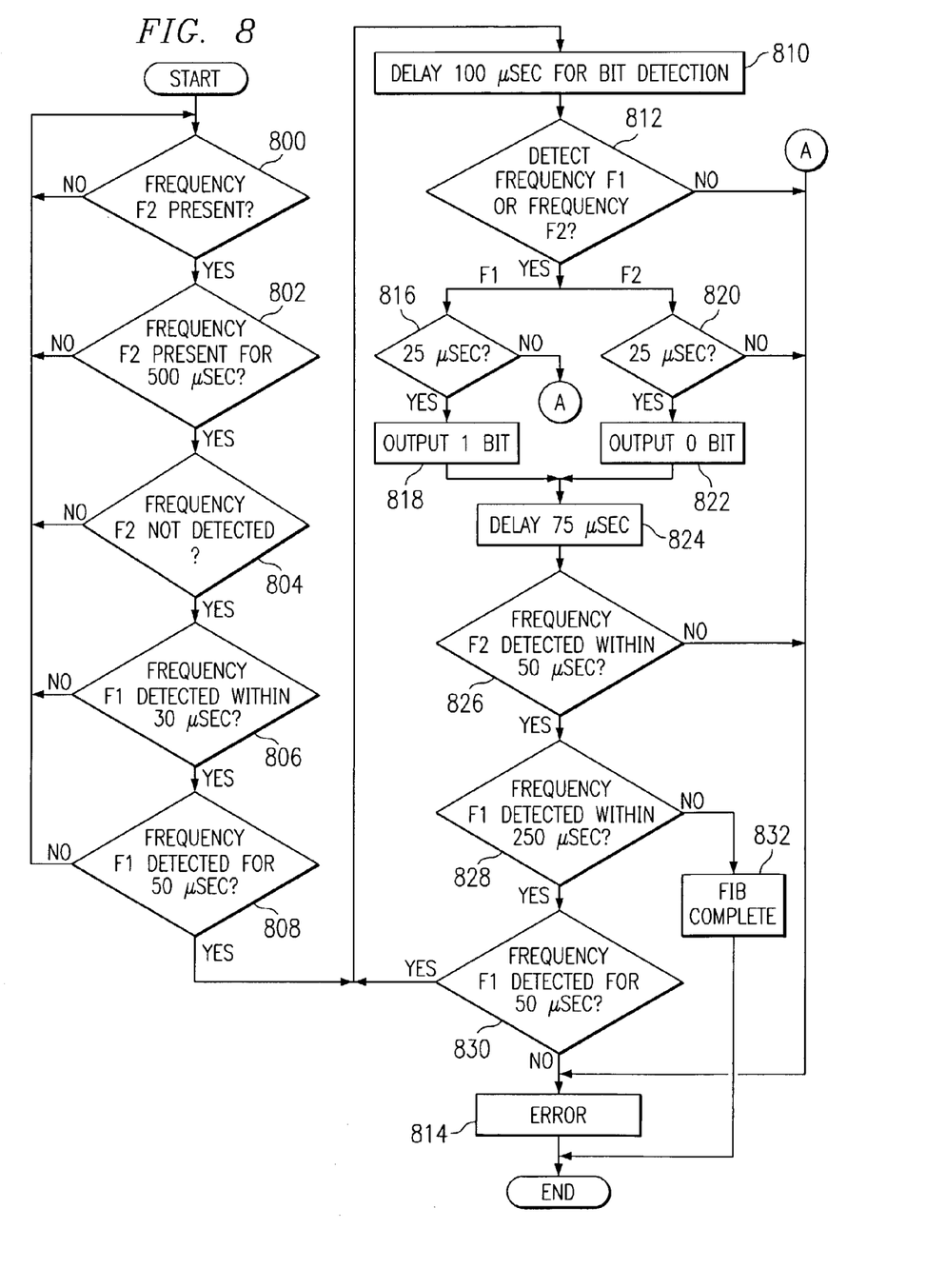
FIG. 8 is a flowchart of a process used for reading data bursts in a format identification burst in accordance with a preferred embodiment of the present invention.

Turning now to FIG. 8, a flowchart of a process used for reading data bursts in a format identification burst is depicted in accordance with a preferred embodiment of the present invention. The process illustrated in FIG. 8 may be implemented in a tape drive system, such as tape drive 100 in FIG. 1. Specifically, the steps illustrated in FIG. 8 may take the form of computer instructions executed by processor 106 in FIG. 1. These instructions are executed for a software component, such as pattern recognition sequencer 202 in FIG. 2 to read data bursts encoded on a tape.

In the example in FIG. 8, particular durations are presented for detecting the different frequencies. The length or duration may vary for each tape drive. In these examples, the tape drive using a narrower track width has a tape speed of 2 meters per second, while the tape drive, which writes on a larger track width has a tape speed of 3.4 meters per second. The tape speed differences may create different timing for drives implementing these steps in a pattern recognition sequencer, such as pattern recognition sequencer 202 in FIG. 2.

The process begins by determining if frequency F2 is present (step 800). This step is used to determine whether a format identification burst will follow. A frequency F2 is written onto the tape prior to the frequency identification burst in this example. If frequency F2 is not detected, the process returns to step 800. Otherwise, a determination is made as to whether frequency F2 is present for at least 500 microseconds (step 802). In this particular example, frequency F2 should be present for 500 microseconds as part of a verification that a format identification burst will follow. If frequency F2 does not last for 500 microseconds, the process returns to step 800. Otherwise, a determination is made as to whether, after the 500 microseconds has passed, frequency F2 is no longer detected (step 804).

If frequency F2 is still present and an absence of the frequency did not occur, the process returns to step 800. If frequency F2 is absent, a determination is made as to whether frequency F1 is detected within 30 microseconds after frequency F2 is absent (step 806). If frequency F1 is not detected within 30 microseconds, the process returns to step 800. Otherwise, a determination is made as to whether frequency F1 is detected or present for 50 microseconds (step 808). If frequency F1 is not present for 50 microseconds, the process returns to step 800. Steps 800, 802, 804, 806, and 808 are employed to verify that a format identification burst will follow.

If a presence of frequency F1 is verified for 50 microseconds, a delay of 100 microseconds occurs before attempting to identify bits in the format identification burst (step 810). In step 808, the frequency F1 verified by this step is the beginning of the first bit in a format identification burst. The 100 microsecond delay is used to advance to a point in the data burst to identify whether the bit is a logical 1 or a logical 0. After the delay, a determination is made as to whether frequency F1 or frequency F2 is detected (step 812). If neither frequency is detected, an error is generated (step 814) with the process terminating thereafter.

If a frequency F1 is detected, a determination is made as to whether frequency F1 is present for 25 microseconds (step 816). This step is used to verify that frequency F1 is present and not an error. If frequency F1 is not present for 25 microseconds, the process proceeds to step 814 as described above. Otherwise, a 1 is output for the bit (step 818). Turning back to step 812, if frequency F2 is detected, a determination is made as to whether this frequency is present for 25 microseconds (step 820). If frequency F2 is not verified as being present for 25 microseconds, the process proceeds to step 814 as described above. Otherwise, a 0 is output for the bit (step 822). Next, a delay of 75 microseconds occurs (step 824). The 75 microsecond delay is used to check to see if the F2 frequency in sections, such as section 404 in FIG. 4A and section 410 in FIG. 4B, returns after the bit detection. This step is employed to check the format of the data burst, such as those illustrated in FIGS. 4A and 4B. This check is mainly used for the case in which the bit is a "1" data bit detection.

Thereafter, a determination is made as to whether frequency F2 is detected within 50 microseconds (step 826). The check for the F2 frequency in step 826 is employed to check the format of the data burst. If the F1 frequency, such as that found in section 408 in FIG. 4B, continued for the entire length of the data burst, and the check for F2 frequency was not performed, then the bit would not be valid, and the sequencer would not detect this case.

If frequency F2 is not detected, the process proceeds to step 814 as described above. If frequency F2 is detected within 50 microseconds, a determination is made as to whether frequency F1 is detected within 250 microseconds (step 828). If frequency F1 is detected within 250 microseconds, another data burst containing a bit may be present, and a determination is made as to whether frequency F1 is detected or present for 50 microseconds (step 830). The F1 frequency check performed in step 830 is the same check that is performed in step 808. Step 808 does not set an error because this step is used to detect the first data bit of the serial sequence. The check performed in step 830 is used to verify the start of the next data bit and to set the error if the F1 frequency does not last long enough to meet the required timing.

If frequency F1 is present for 50 microseconds, the process proceeds to step 810 as described above. Otherwise, the process proceeds to step 814 as described above.

With reference again to step 828, if frequency F1 is not detected within 250 microseconds after frequency F2, the format identification burst has completed (step 832) with the process terminating thereafter.

The description of the flowchart in FIG. 8 is provided as a specific illustration of how detection of data bursts in a format identification burst may be processed. This detailed example includes steps that may be employed to verify the frequency of signals at different frequencies to avoid errors in reading data. Of course, the different durations may vary depending on how the data bursts are written in a format identification burst.

Thus, the present invention provides an improved method, apparatus, and computer instructions for writing and reading a tape, which may have different tape formats with different track widths in a manner that allows different tape drives to detect whether data is present on a tape even if the data is written in a different format and with a different track width. The mechanism of the present invention employs the use of encoding information using data bursts generated by alternating different frequencies on the tape to encode bits of data. The mechanism of the present invention writes an erase pattern in a track width for a tape drive using a wider track width and may write the data burst using a narrower track width. The use of the erase pattern and the narrower track width allow for a tape drive using the wider track width to detect and read data encoded in the data burst. This data may provide identification information about the tape, such as the tape identifier and tape load statistics. This information may be obtained even though the tape drive is unable to read the data following this identification information. In this manner, accidental erasure and overwriting of tapes may be avoided.

The examples described above illustrate processing that occurs from a single channel in a multichannel system. Data for a format identification burst may be read from a number of different channels in read/write channels 108 in FIG. 1. A cyclic redundancy check (CRC) is included for the data. This CRC is employed to identify which decoders from a set of decoders have properly decoded the data. For example, read/write channels 108 in FIG. 1 may contain 16 channels in which all 16 channels read data and the data detected may be based on what is detected by the majority of channels.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. For example, the illustrations above employ writing data bursts using two frequencies to encode a bit of data. Depending on the particular implementation, more than two frequencies may be employed and the data may be encoded as having multiple levels, rather than just a logical 1 or logical 0. In this manner, the data bursts may provide data in a decimal or hexadecimal form, rather than in a binary form.

Further, the examples illustrate an erase pattern being written having a track width for a legacy for wider track tape drive system with the data burst being encoded within that track width using a first track. Alternatively, the data burst may not be encoded on the erase pattern, but may be placed adjacent to the erase pattern depending on the particular implementation. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for writing data to a magnetic media, the method comprising:

writing a first frequency on a first track on the magnetic media, the first track having a first track width;

writing a second frequency on the first track, wherein a combination of the first frequency and the second frequency encodes a bit of data on the first track; and creating a particular pattern on a second track on the magnetic media, wherein the particular pattern results in a null response when read and wherein the bit of data on the first track is readable by a tape drive system using a second track width that is wider than the first track width.

2. The method of claim 1 further comprising:

repeating the step of writing the first frequency and writing the second frequency to encode data on the magnetic media.

3. The method of claim 2, wherein the data identifies the magnetic media.

4. The method of claim 3, wherein the data includes at least one of a tape identifier, load statistics, and a volume number.

5. The method of claim 2, wherein the magnetic media is a tape and wherein the data is written at a beginning of the tape.

6. The method of claim 1, wherein the second track is adjacent to the first track.

7. The method of claim 1, wherein the second track has the second track width.

8. The method of claim 1, wherein the second track encompasses at least a portion of the first track and an area adjacent to the first track.

9. The method of claim 1, wherein the creating step is performed prior to the writing steps.

10. The method of claim 1 further comprising:

creating the particular pattern on a third track on the magnetic media, the third track being adjacent to the first track.

11. The method of claim 1, wherein the particular pattern is an erase pattern.

12. A method for writing data to a magnetic tape, the method comprising:

writing a data burst having a first frequency and a second frequency on a first track on the magnetic tape, wherein the first frequency is written prior to the second frequency in which data burst encodes a bit of data based on a difference between a length of the first frequency and a length of the second frequency; and creating a pattern on a second track on the magnetic tape, wherein the pattern generates a null response when read and wherein the bit of data on the first track is readable by a tape drive system using a second track width that is wider than the first track width.

13. The method of claim 12, wherein the bit of data is a logical one if the length of the first frequency is greater than the length of the second frequency.

14. The method of claim 12, wherein the bit of data is a logical one if the length of the first frequency is greater than the length of the second frequency by a selected ratio.

15. The method of claim 12 further comprising:
repeating the writing step to serially encode a set of data.

16. The method of claim 15, wherein the set of data is located at a beginning of the magnetic tape.

17. The method of claim 12, wherein the creating step is performed prior to the writing step.

18. The method of claim 12 further comprising:
creating the particular pattern on a third track on the magnetic tape, wherein the third track is adjacent to the first track.

19. The method of claim 12, wherein the pattern is an erase pattern.

20. The method of claim 12, wherein the second track is adjacent to the first track.

21. The method of claim 12, wherein the second track encompasses at least a portion of the first track and an area adjacent to the first track.

22. A tape drive system comprising:
a read/write head;
a motor system for moving a magnetic tape across the read/write head;
a channel connected to the read/write head;
a controller connected to the channel, wherein the controller executes a set of instructions to write a plurality of data bursts using the read/write head with each data burst having a first frequency and a second frequency on a first track on the magnetic tape in which the first frequency is written prior to the second frequency in which each data burst encodes a bit of data based on a difference between a length of the first frequency and a length of the second frequency; and create an erase pattern on a second track on the magnetic tape, wherein the bit of data on the first track is readable by a tape drive system using a second track width that is wider than the first track width.

23. The tape drive system of claim 22, wherein the second track is adjacent to the first track.

24. The tape drive system of claim 22, wherein the second track encompasses at least a portion of the first track and an area adjacent to the first track.

25. A tape drive system comprising:
a read/write head;
a motor system for moving a magnetic tape across the read/write head;
a channel connected to the read/write head;
a controller connected to the channel, wherein the controller executes a set of instructions to read a plurality of data bursts on the magnetic tape using the read/write head with each data burst having a first frequency and a second frequency on a first track on the magnetic tape in which the first frequency is written prior to the second frequency, and decode bits of data from the plurality of data bursts based on a difference between a length of the first frequency and a length of the second frequency in each data burst within the plurality of data bursts.

26. A data processing system for writing data to a magnetic media, the data processing system comprising:
a bus system;
a communications unit connected to the bus system;
a memory connected to the bus system, wherein the memory includes a set of instructions; and
a processing unit connected to the bus system, wherein the processing unit executes the set of instructions to write a first frequency on a first track on the magnetic media, the first track having a first track width; write a second frequency on the first track in which a combination of the first frequency and the second frequency encodes a bit of data on the first track; and create a particular pattern on a second track on the magnetic media in which the particular pattern results in a null response when read and wherein the bit of data on the first track is readable by a tape drive system using a second track width that is wider than the first track width.

27. A data processing system for writing data to a magnetic tape, the data processing system comprising:
a bus system;
a communications unit connected to the bus system;
a memory connected to the bus system, wherein the memory includes a set of instructions; and
a processing unit connected to the bus system, wherein the processing unit executes the set of instructions to write a data burst having a first frequency and a second frequency on a first track on the magnetic tape in which the first frequency is written prior to the second frequency in which data burst encodes a bit of data based on a difference between a length of the first frequency and a length of the second frequency; and create a pattern on a second track on the magnetic tape in which the pattern generates a null response when read, wherein the bit of data on the first track is readable by a tape drive system using a second track width that is wider than the first track width.

28. The method of claim 27, wherein the second track is adjacent to the first track.

29. The method of claim 27, wherein the second track encompasses at least a portion of the first track and an area adjacent to the first track.

30. A data processing system for writing data to a magnetic media, the data processing system comprising:
first writing means for writing a first frequency on a first track on the magnetic media, the first track having a first track width;
second writing means for writing a second frequency on the first track, wherein a combination of the first frequency and the second frequency encodes a bit of data on the first track; and
creating means for creating a particular pattern on a second track on the magnetic media, wherein the particular pattern results in a null response when read and wherein the bit of data on the first track is readable by a tape drive system using a second track width that is wider than the first track width.

31. The data processing system of claim 30 further comprising:
repeating means for repeating the step of writing the first frequency and writing the second frequency to encode data on the magnetic media.

32. The data processing system of claim 31, wherein the data identifies the magnetic media.

33. The data processing system of claim 32, wherein the data includes at least one of a tape identifier, load statistics, and a volume number.

34. The data processing system of claim 31, wherein the magnetic media is a tape and wherein the data is written at a beginning of the tape.

35. The data processing system of claim 30, wherein the second track is adjacent to the first track.

36. The data processing system of claim 30, wherein the second track has the second track width.

37. The data processing system of claim 30, wherein the second track encompasses at least a portion of the first track and an area adjacent to the first track.

38. The data processing system of claim 30, wherein the creating means is initiated prior to the first writing means and the second writing means.

39. The data processing system of claim 30, wherein the creating means is a first creating means and further comprising:
   second creating means for creating the erase pattern on a third track on the magnetic media, the third track being adjacent to the first track.

40. The data processing system of claim 30, wherein the particular pattern is an erase pattern.

41. A data processing system for writing data to a magnetic tape, the data processing system comprising:
   writing means for writing a data burst having a first frequency and a second frequency on a first track on the magnetic tape, wherein the first frequency is written prior to the second frequency in which data burst encodes a bit of data based on a difference between a length of the first frequency and a length of the second frequency; and
   creating means for creating a pattern on a second track on the magnetic tape, wherein the pattern generates a null response when read, wherein the bit of data on the first track is readable by a tape drive system using a second track width that is wider than the first track width.

42. The data processing system of claim 41, wherein the bit of data is a logical one if the first length is greater than the second length.

43. The data processing system of claim 41, wherein the bit of data is a logical one if the first length is greater than the second length by a selected ratio.

44. The data processing system of claim 41 further comprising:
   repeating means for repeating the writing step to serially encode a set of data.

45. The data processing system of claim 44, wherein the set of data is located at a beginning of the magnetic tape.

46. The data processing system of claim 41, wherein the creating means is performed prior to the writing step.

47. The data processing system of claim 41, wherein the creating means is a first creating means and further comprising:
   second creating means for creating the erase pattern on a third track on the magnetic tape, wherein the third track is adjacent to the second track.

48. The data processing system of claim 41, wherein the pattern is an erase pattern.

49. A computer program product in a computer readable medium for writing data to a magnetic media, the computer program product comprising:
   first instructions for writing a first frequency on a first track on the magnetic media, the first track having a first track width;
   second instructions for writing a second frequency on the first track, wherein a combination of the first frequency and the second frequency encodes a bit of data on the first track; and
   third instructions for creating a particular pattern on a second track on the magnetic media, wherein the particular pattern results in a null response when read and wherein the bit of data on the first track is readable by a tape drive system using a second track width that is wider than the first track width.

50. A computer program product in a computer readable medium for writing data to a magnetic tape, the computer program product comprising:
   first instructions for writing a data burst having a first frequency and a second frequency on a first track on the magnetic tape, wherein the first frequency is written prior to the second frequency in which data burst encodes a bit of data based on a difference between a length of the first frequency and a length of the second frequency; and
   second instructions for creating a pattern on a second track on the magnetic tape, wherein the pattern generates a null response when read, wherein the bit of data on the first track is readable by a tape drive system using a second track width that is wider than the first track width.

51. The method of claim 50, wherein the second track is adjacent to the first track.

52. The method of claim 50, wherein the second track encompasses at least a portion of the first track and an area adjacent to the first track.

53. The method of claim 41, wherein the second track is adjacent to the first track.

54. The method of claim 41, wherein the second track encompasses at least a portion of the first track and an area adjacent to the first track.

* * * * *